Dec. 11, 1956 D. L. WAUGH 2,773,540
METHOD FOR MANUFACTURING ENDLESS V-TYPE BELTS
Filed Dec. 23, 1952 2 Sheets-Sheet 1

INVENTOR.
D. L. WAUGH
BY
ATT'Y.

Dec. 11, 1956 D. L. WAUGH 2,773,540
METHOD FOR MANUFACTURING ENDLESS V-TYPE BELTS
Filed Dec. 23, 1952 2 Sheets-Sheet 2

INVENTOR.
D. L. WAUGH
BY
ATT'Y.

United States Patent Office 2,773,540
Patented Dec. 11, 1956

2,773,540

METHOD FOR MANUFACTURING ENDLESS V-TYPE BELTS

Dale L. Waugh, Dayton, Ohio, assignor to The Dayton Rubber Company, a corporation of Ohio Application December 23, 1952, Serial No. 327,572

10 Claims. (Cl. 154—4)

The present invention relates to belts, particularly endless belts and an improved method for manufacturing same.

Although the field of belting is being constantly expanded and the belting art has become highly developed with the advent of many improvements over the past 20 years, there remain many universally recognized shortcomings of the present types of belts. Included among these are unsatisfactory flexibility, excessive operating temperatures, growing or stretching during use, seating or excessive wedging into the pulley grooves, and bowing or non-linear travel of the belt between pulleys. In belts comprising a continuously wound cord or cable strength portion of laterally aligned helices, great difficulty has been encountered in establishing during the building process and maintaining during operation, the transverse alignment of these cables necessary to their equal participation in the carrying of the belt load. In belts wherein the width is relatively small as compared to the belt thickness, there is an additional problem of cutting the belting material so that the surfaces thereof will be straight and in the proper angular relationship. Finally, the roughness and surface irregularities common to the presently known belts cause objectionable noise and damaging vibration especially where the drive includes a flat idler pulley in contact with the wide outside surface of the belt.

It is accordingly an object of the present invention to provide a belt capable of continued satisfactory operation over a long period of time.

It is another object of the present invention to provide belts which will offer a minimum of resistance to flexing and thereby operate at lower temperatures.

It is a further object of the present invention to provide a belt which during continued usage will neither stretch nor shrink and will maintain its proper riding position in the pulley grooves.

It is still a further object of the present invention to provide a belt which will be free of a tendency to bow or travel in an arcuate path between pulleys.

It is yet a further object of the present invention to provide a belt having a continuously wound strength portion wherein the transverse alignment of the helices thereof will remain straight and parallel to the axis of flexure throughout the life of the belt.

Still another object of the present invention is to provide a cog belt incorporating the desired objects and advantageous features herein disclosed.

It is a further object of the present invention to provide a belt having a smooth, polished outer surface.

It is yet another object of the present invention to provide a method for manufacturing such belts.

For the achievement of these and other objects and advantages of the present invention to be made apparent from a reading of the present disclosure, it is proposed to provide a prestressed endless belt wherein the intermediate strength or neutral axis portion is under stress from forces acting radially of the belt, the portion of the belt interiorly of said neutral axis portion, is in circumferential compression, and the portion of the belt exteriorly of said neutral axis portion is under circumferential tension, all while the belt is in its natural unflexed state. This prestressing pattern is desirable in all types of endless belt constructions insofar as all embody the inner compresion section, intermediate neutral axis section and outer tension section. The features of the present invention are, however, especially applicable to belts wherein the outer tension section is composed of superimposed layers of rubberized fabric and the inner compression section is formed of a rubber-like composition which may, or may not, contain textile material.

When the endless type belts are bent around the pulley, it is well known that a vertical plane transversely of the belt will pivot about the inextensible neutral axis portion. It follows from this that the tension section or that part of the belt on the side of the neutral axis away from the direction of flexure is placed under tension by the longitudinal stressing accompanying belt flexing. At the same time, the portion of the belt underlying the neutral axis section toward the direction of flexure is placed under compression by the reduction in length of the inner periphery of the belt. The neutral axis portion of the belt which is composed of an inextensible but flexible material, by reason of it being located at the pivotal point at the line of flexure, whence it derives its name, is not substantially stressed by the flexure itself. Since, however, it is this inextensible portion of the belt that actually carries the belt load, the material within this section is subjected to considerable tension by that load. The prestressing proposed by the present invention anticipates the stresses which will be applied to a belt as it flexes about a pulley with the result that even while the belt is in its natural state of repose, it has a tendency to take the shape which it will be forced to assume in passing about a pulley. Because of this tendency, the resistance of the belting material to the flexing of the belt is materially reduced, so that the belt may be more easily flexed and this, without the internal friction and excessive heat usually accompanying such flexure.

The present invention also encompasses a prestressing arrangement as described above wherein the stress gradually decreases toward the intermediate neutral axis section. That is to say that the upper or outermost surface will be under greater tension than the remainder of the belt, while the innermost surface will be under greater compression than the remainder of the belt while the same is in its natural unflexed state. This particular stress pattern, in addition to further complying with the natural stresses that will take place upon belt flexure, produces a desirable radial stress concentrated at the neutral axis portion of the belt. Among the particular advantages arising from this particular radial stress are the facts that during belt operation the inherent forces within the belt are continuously acting to maintain the linear arrangement of the neutral axis portion parallel to the true axis of flexure, and the fact that as the belt is compressed between the highly tensioned outer surface and the highly compressed inner surface, it tends to expand outwardly at its sides thereby having an increased transverse rigidity leading to superior engagement with the driving portions of the pulley grooves, all to the desirable end that the belt will not tend to seat or wedge more deeply into the pulley grooves so as to destroy the preferred ratio of effective pulley or pitch diameters.

Another advantage accruing from the graduated prestressing of the present invention is the low stretch and low shrinkage that is likely to result as the belt operates for a long period of time. These undesirable changes in the length of the belt are prevented by the combination of the confining force of the highly tensioned outer surface of the belt which, because of its pretensioned condition, is relatively less extensible than the remaining parts of the belt and the expansive force of the highly compressed inner surface of the belt which constantly urges the belt to the limit of its length, as defined by the said relatively inextensible outer surface.

For a convenient, economical and commercially feasible method of producing or manufacturing belts of the type herein considered, it is proposed to build the raw, laminated belt in an inverted manner, that is, with the portion of the belt that will eventually form its exterior or outer circumferential portion, being built as its interior; and vulcanizing the belt without changing it from the inverted position in which it was built; and then, after vulcanization, turning the belt through 180° or inside out so as to bring the respective portions of the belt into their proper relationship. In this manner that portion of the belt which will eventually form the outer larger circumference thereof is built, and throughout the vulcanization process is maintained, at the lesser circumference of the inside of the belt. At the same time, that portion of the belt eventually to form the shorter inner circumference thereof is built and throughout vulcanization has a length equal to the eventual outer circumference of the belt. It must develop that, as the belt is turned inside out, the interior and exterior surfaces of the belt as it was originally built, are respectively forced into expanded and retracted position, creating the desired stresses. Where greater prestressing or a more definite graduation thereof is desired, one may, in keeping with the present invention, impart initial stress to the laminations of the raw belt as it is being built. Since in keeping with present invention, the outermost section, commonly referred to as the tension section, will be built up first, the greatest tension should be imparted to the first lamina of the inverted construction with the tension gradually decreasing with successive laminae until the neutral axis portion is reached. In building up the portion of the belt to occupy the inner portion thereof, commonly known as the compression section, the tension applied should be less than that to the laminae of the tension section and should successively decrease in a direction away from the neutral axis portion. As a result, the tension of the various superimposed layers in the belt will increase progressively from the strength band outward; while in the compression section, the compression will gradually increase throughout the thickness of the section from the neutral axis layer toward the inner surface of the belt. Where less prestressing or a less definite graduation thereof is desired a reverse pattern of initial stresses imparted to the various raw belt laminae may be followed in the building process. That is, the first layer of fabric wound about the mandrel may be applied more loosely than the remaining layers each of which will be applied at successively increasing tension. When belts are cut from a sleeve so constructed and are turned inside out, the more loosely wound fabric layers being toward the outside will be stretched with less tension.

Since that portion of the belt eventually to form the wide outside or back surface thereof is built in direct contact with the building mandrel and may remain there throughout the vulcanization, the finish and contour of this back surface will correspond closely to the finish and contour of the mandrel as to smoothness, regularity, uniformity and the like. Thus, where a polished metallic or plastic mandrel is used and where the back surface of the belt remains in contact with the polished surface throughout the vulcanization, said back surface will have a polished or plate finish characterized by a mirror-like smoothness and a freedom from surface irregularities. A belt thus constructed will operate with its back surface in contact with an oppositely rotating flat pulley without the objectionable vibration usually resulting from such operation. The width of this smooth outer surface will also be more uniform so that belt squeak caused by variations in the width of the belt top will be eliminated.

For further clarification of the principles of the present invention, reference may be had to the following detailed description in connection with the appended drawings.

Figure 1:
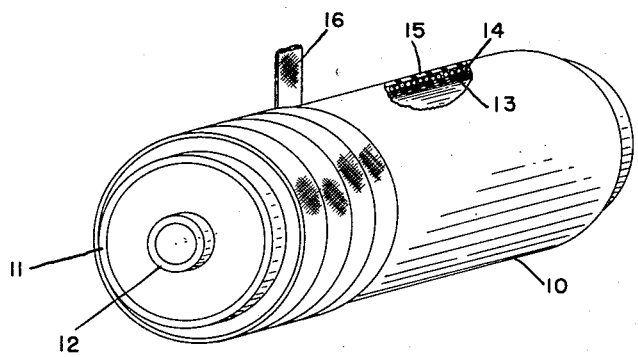
Figure 1 is a view in perspective of a typical mandrel and belt sleeve built thereon in accordance with the present invention.
Figure 2:
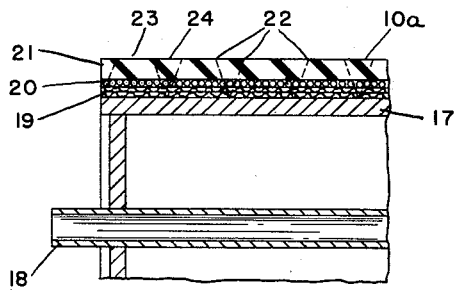
Figure 2 is a cross section through a typical mandrel and a belt sleeve built thereon according to the present invention showing the manner in which individual belts are formed from the belt sleeve.

Referring now to Figures 1 and 2 and one preferred method for manufacturing belts according to the present invention, there is shown a belt sleeve 10 of rubber and textile material built up about a typical cylindrical mandrel 11 fixedly mounted upon rotating shaft 12. Referring in particular to the cut-away portion of the belt sleeve in Figure 1, it can be seen that the same is constructed in inverted manner, that is, with the tension section 13, shown in this preferred illustration to be composed of superimposed layers of rubberized fabric, located on the inside of the sleeve immediately adjacent and coextensive with the surface of the mandrel 11; while outwardly thereof are located the inextensible neutral axis portion 14 and rubber-like compression section 15. For the reasons set forth above, it may be desirable to wind the respective layers of the rubberized fabric forming the tension section 13 under varying tensions successively decreasing or increasing from the innermost layer surrounding the surface of the mandrel to the outermost layer lying next to the neutral axis portion 14. After the sleeve 10 has been built up in any well known conventional manner such, for example, as that set forth in Freedlander Patent No. 1,591,303, in keeping with the modifications thereof embodied in the present invention, it is compacted or placed under compression by any suitable means, such as the conventional rag wrapper 16 shown in Figure 1. The sleeve thus compacted is then subjected to vulcanizing conditions as for example, in an open steam autoclave, hot air furnace, water-curing apparatus or the like.

In Figure 2 about the mandrel 17 integrally mounted upon rotatable shaft 18 is shown a belt sleeve 10a similar to that above described in connection with Figure 1 consisting of a tension section 19 of rubberized fabric adjacent to the surface of the mandrel, a neutral axis section 20 composed of continuously wound inextensible cord wound in concentric axially aligned helices, and an outer compression section 21 of rubber-like composition. The dotted lines 22 herein illustrate the manner in which the belt sleeve 10a is cut to form the series of annular belt members of trapezoidal cross section 23 separated by ring scrap 24.

For conservation of time and materials in the construction of the belt according to this invention, the same mandrel may be used throughout the building, vulcanizing and cutting process without ever removing the belt sleeve from the mandrel on which it was built, until the individual annular endless belt members have been formed. As previously explained, the mandrel such as 11 of Figure 1 or 17 of Figure 2 may have a highly polished metallic or plastic surface to impart a uniform mirror-like smoothness and regularity to the back surface of the belts where the belt sleeve is vulcanized upon such mandrel. It is desirable that the belt sleeve such as in 10a in Figure 2 should be vulcanized prior to being cut into the individual belt by severance along the lines 22 in that the vulcanized rubber and textile material will be less flexible under the pressure of a knife or other cutting instrument so that the cuts along the lines 22 which will subsequently form the side driving faces of the finished belt may be straight and in exact angular relationship to the other surfaces of the belt. Whether or not, however, the belt sleeve is so vulcanized prior to the cutting operation, the preferred belt construction illustrated may be easily and satisfactorily cut into individual belts with improved accuracy over the belt sleeves built in the conventional manner in that the layers of rubberized fabric forming the tension section 19 lying immediately adjacent to the surface of the mandrel, offer a firm cutting base giving much greater stability to the belting material as it is being cut than was possible under the old construction wherein the more flexible rubber-like section 21 was next adjacent to the mandrel surface.

This same firm foundation offered by the superimposed layers of rubberized fabric also plays an important part in the building of the belts according to the present invention, in that a firm base is formed upon which to wind the helices of the neutral axis cord forming the neutral axis section 20. Because the layers of rubberized fabric will be straight in conformance to the surface of the mandrel, the foundation upon which the neutral axis cords are wound, will likewise be straight so that their transverse alignment will be assured. Whereas, in the old construction having the compression section of rubber-like material next adjacent to the mandrel surface, the cutting knives or other cutting instruments tended to force the neutral axis cords down into the rubber-like material thereby weakening them and separating them from their firm bond with the remaining material of the belt, the firm support afforded these neutral axis cords by the fabric layers in the present construction holds them firm against the pressures of the cutting instrument so that the said undesirable results are avoided.

Where it is desired to provide the annular member formed according to the present invention with a rubberized fabric cover, these annular members may be cut from the sleeve built up in the inverted manner according to this invention prior to its vulcanization. In this case, however, it is important that during the covering and subsequent vulcanizing operations, the annular member should at all times be kept in its inverted position, that is, with its rubberized fabric tension section toward the inner circumference and its compression section toward the outer circumference of the belt. This is important because if the belt member in an unvulcanized state is turned through 180 degrees from the condition in which it was built to the condition in which it will subsequently operate, the plasticity of the rubber and textile material will be such that the prestressing effect will be lost, the respective portions of the belt assuming substantially unstressed states with the belt in its finally inverted position. Furthermore, since the respective portions of the belt will tend to strech or compress, and to change their length as required from their being switched from inner to outer circumferences of the belt surface, or vice versa, the necessary adhesive bond between the laminations thereof will be destroyed to the ultimate damage of the completed belt.

Figure 3:
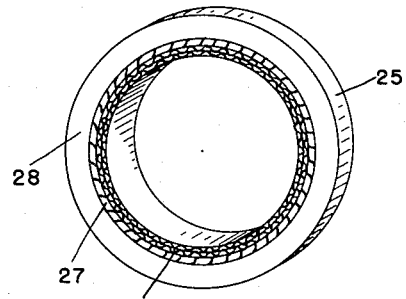
Figure 3 is a perspective of a belt constructed according to the present invention after it has been vulcanized and before it has been turned inside out.

In Figure 3 is shown an individual annular belt member 25 after it has been vulcanized and cut as illustrated in Figure 2. The belt here is still in the position in which it was built, that is, with the tension section 26 of rubberized fabric around the inner circumference, the neutral axis section 27 exteriorly thereof and the compression section 28 around the outer circumference of the belt.

Figure 4:
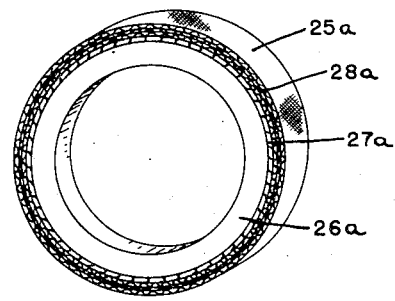
Figure 4 is a perspective of a final belt constructed according to present invention.

In Figure 4, however, the belt 25a is shown as it is finally inverted to operative position wherein the compression section 26a forms the narrow inner portion of the belt, the neutral axis section 27a is exteriorly thereof and the tension section 28a of rubberized fabric forms the wider outer portion on the outer periphery of the belt.

Figure 5:
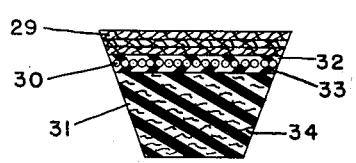
Figure 5 is a transverse section through a typical belt constructed according to the present invention showing in greater detail the components thereof.

Figure 5 is a finished belt according to the present invention but embodying certain modifications thereof shown in enlarged cross section. The tension section 29 is composed of superimposed layers of rubberized fabric similar to the construction previously described and the neutral axis section consisting of concentrically wound helices of continuous inextensible strength cord 30 is also similar to that in the belt previously shown and described.

In this particular construction, however, it will be observed that the compression section of rubber-like composition 31 contains finely ground discrete fibers 34 dispersed therein and extending transversely of the longitudinal axis of the belt. These transverse fibers impart a still greater transverse rigidity to the belt without detracting from its improved flexibility.

Figures 6, 7:
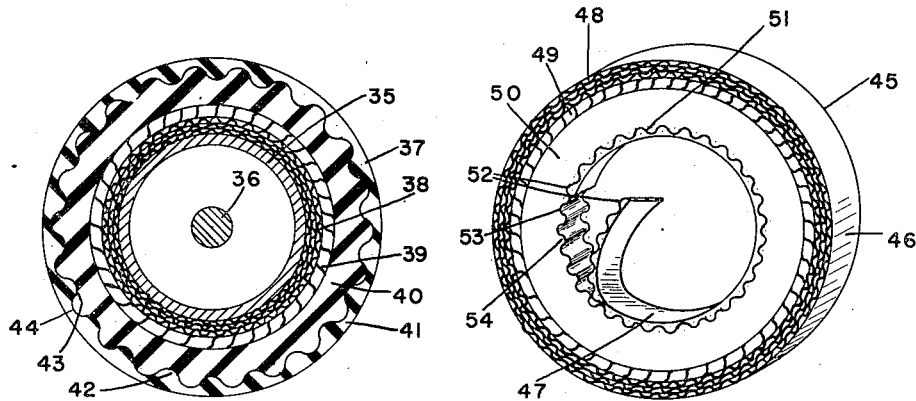
Figure 6 is a vertical section through a cog type belt sleeve built upon a mandrel according to the present invention.
Figure 7 is a perspective of an individual cog type belt embodying the features of this invention.

Also shown in this figure are cushion layers of rubber-like composition 32 and 33 such as are commonly used in laminated belt construction having a concentrically wound continuous inextensible cord neutral axis section as shown in 30. These layers are provided in the building of the belt to allow sufficient rubber in the vicinity of the neutral axis cord to flow upon vulcanization of the belt so as to completely surround and embed the neutral axis cords in rubber. It will also be observed that the tension section 29 comprises a limited number of plies so that the hard firm base for supporting the neutral axis cord while it is being spun on will not be lost to the cushioning effect of an excessive thickness of the rubberized fabric.

Where a cog type belt according to the present invention is desired for even greater flexibility, the same may be constructed as shown in Figure 6. About the mandrel surface 35, which may be highly polished, rotatably mounted upon shaft 36 is built a belt sleeve 37 comprising the rubberized fabric tension section 38, inextensible cord neutral axis section 39 and rubber-like compression section 40 in the inverted arrangement previously described. Into the compression section 40 however is forced the toothed matrix pad 41 which remains in continuous engagement with the compression section 40 throughout vulcanization so that the teeth 42 of the matrix pad 41 will form transverse grooves 43 separated by transverse ribs or cogs 44. The matrix pad 41 may be forced into the compression section 40 by any combination of heat and/or pressure either before or after the compression section stock is wound upon the belt sleeve. The matrix pad 41 is preferably composed of a relatively hard vulcanized rubber composition and is usually formed in a corrugated platen vulcanizing press.

After the belt sleeve thus formed is vulcanized in the manner above described, individual belts are cut from the sleeve and turned inside out. As shown in Figure 7 the individual cog belt 45 has been turned inside out so that its wide surface 46 forms the outer circumference and the narrow surface 47 forms the inner circumference of the belt. The tension section 48, neutral axis section 49 and compression section 50 having transverse grooves 53 and ribs 54 alternately about its inner surface are arranged in the conventional manner. As shown, the matrix pad 51 should remain with its teeth 52 impressed into the compression section until after the cutting operation to give additional support to the belt and particularly to the toothed portion. After the cutting and either before or after the individual belt is inverted, the matrix pad should be stripped from the belt as shown in Figure 7. To facilitate this stripping a nonvulcanizable releasing agent should be applied to the matrix pad before it is pressed into the compression section.

For purposes of clarity and brevity in the above-detailed description of the principles of the present invention, the present disclosure has dealt principally with a raw edge type construction, having a rubberized fabric tension section, a continuously wound cord neutral axis section, and a rubber-like composition compression section such as may be built, vulcanized, and cut from the same building mandrel without ever having to be removed therefrom during the manufacturing process. While this particular construction is preferred, and lends itself most completely to the principles of this invention to obtain all of the advantages resulting therefrom, it is to be understood that this invention is not confined to the particular construction shown but includes any endless belt construction having the prestressed arrangement as set forth and any method for the manufacture of the same involving the building and vulcanizing of the belt maintained in inverted position until the manufacturing process is completed.

I claim:

1. A method for manufacturing endless rubber V-type belts comprising tension, neutral axis and compression sections which comprises winding about a suitable mandrel a tension layer comprising at least one layer of rubberized fabric, applying thereto a neutral axis layer comprising at least one layer of helically wound strength cord, winding thereon a compression layer comprising rubber, vulcanizing the cylindrical belt sleeve thus formed, cutting circumferentially of the vulcanized sleeve to form individual V-type annular belts in inverted position and turning these belts inside out.

2. A method according to claim 1 wherein said compression section comprises a textile material.

3. A method according to claim 2 wherein said textile material is in the form of discrete fibers.

4. A method for the manufacture of endless rubber belts having an outer tension section, an intermediate inextensible neutral axis section and an inner compression section comprising winding about a suitable mandrel a plurality of layers of rubberized fabric each of which is applied under different tension from the previously wound layer to form the tension section of the belt, spinning thereon at least one layer of helically wound strength cord to form the inextensible neutral axis section of the belt, winding thereon a layer of rubber composition to form the compression section, vulcanizing the cylindrical belt sleeve thus formed, cutting circumferentially of the vulcanized sleeve to form individual V-type belts in inverted position and turning these belts inside out.

5. A method for the manufacture of endless rubber belts having an outer tension section, an intermediate inextensible neutral axis section and an inner compression section comprising winding about a suitable mandrel a plurality of layers of rubberized fabric each of which is applied under less tension than the previously wound layer to form the tension section of the belt, spinning thereon at least one layer of helically wound strength cord to form the inextensible neutral axis section of the belt, winding thereon a layer of rubber composition to form the compression section, vulcanizing the cylindrical belt sleeve thus formed, cutting circumferentially of the vulcanized sleeve to form individual V-type belts in inverted position and turning these belts inside out.

6. A method for the manufacture of endless rubber belts having an outer tension section, an intermediate inextensible neutral axis section and an inner compression section comprising winding about a suitable mandrel a plurality of layers of rubberized fabric each of which is applied under greater tension than the previously wound layer to form the tension section of the belt, spinning thereon at least one layer of helically wound strength cord to form the inextensible neutral axis section of the belt, winding thereon a layer of rubber composition to form the compression section, vulcanizing the cylindrical belt sleeve thus formed, cutting circumferentially of the vulcanized sleeve to form individual V-type belts in inverted position and turning these belts inside out.

7. A method for manufacturing endless rubber V-type belts comprising tension, neutral axis and compression sections which comprises winding about a suitable mandrel a tension layer comprising at least one layer of rubberized fabric, applying thereto a neutral axis layer comprising at least one layer of helically wound strength cord, winding thereon a compression layer comprising rubber, cutting circumferentially of the tubular sleeve thus formed at an acute angle to the surface thereof to make individual belt bodies of trapezoidal cross section with the larger base of said trapezoid against the surface of said mandrel thereby providing a firm base for the cutting operation, and vulcanizing the bodies thus formed.

8. A method for manufacturing endless rubber V-type belts comprising tension, neutral axis and compression sections which comprises winding about a suitable smooth-surfaced mandrel a tension layer comprising at least one layer of rubberized fabric, applying thereto a neutral axis layer comprising at least one layer of helically wound strength cord, winding thereon a compression layer comprising rubber, vulcanizing the cylindrical belt sleeve thus formed while said tension layer is in contact with said smooth-surfaced mandrel whereby a smooth surface is imparted to the outer surface of said tension section, cutting circumferentially of the vulcanized sleeve to form individual V-type annular belts in inverted position and turning these belts inside out.

9. A method for the manufacture of endless cog belts comprising building a rubber-containing belt sleeve in inverted manner about a suitable mandrel, impressing a toothed matrix pad into the rubber outer surface of the sleeve, vulcanizing the sleeve and turning the individual belts formed therefrom inside out.

10. A method for the manufacture of endless cog belts comprising building a belt sleeve in inverted position by winding about a suitable mandrel a plurality of layers of rubberized fabric, winding thereon at least one layer of inextensible material, and winding thereon a layer of rubber composition into which has been impressed a toothed matrix pad.

References Cited in the file of this patent

UNITED STATES PATENTS

| | | |
|---|---|---|
| 1,931,309 | Thompson | Oct. 17, 1933 |
| 2,024,443 | Freedlander | Dec. 17, 1935 |
| 2,067,400 | Koplin et al. | Jan. 12, 1937 |
| 2,268,865 | Freedlander | Jan. 6, 1942 |
| 2,392,373 | Freedlander | Jan. 8, 1946 |
| 2,442,037 | Carter et al. | May 25, 1948 |
| 2,598,158 | Fihe et al. | May 27, 1952 |